(12) United States Patent
Iida et al.

(10) Patent No.: US 7,177,141 B1
(45) Date of Patent: Feb. 13, 2007

(54) SOLID ELECTROLYTIC CAPACITOR ELEMENT, MANUFACTURING METHOD THEREFOR, AND SOLID ELECTROLYTIC CAPACITOR

(75) Inventors: Takahisa Iida, Osaka (JP); Mutsumi Yano, Osaka (JP); Mamoru Kimoto, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/483,834

(22) Filed: Jul. 10, 2006

(30) Foreign Application Priority Data

Jul. 28, 2005 (JP) ............................. 2005-218817

(51) Int. Cl.
*H01G 4/228* (2006.01)
*H01G 9/00* (2006.01)

(52) U.S. Cl. ...................... 361/540; 361/531; 361/533; 29/25.03

(58) Field of Classification Search ................ 361/531, 361/533, 538, 540; 29/25.03
See application file for complete search history.

(56) References Cited

FOREIGN PATENT DOCUMENTS

| JP | 04159705 A | * | 6/1992 |
| JP | 05283297 A | * | 10/1993 |
| JP | 2000-068157 | | 3/2000 |

* cited by examiner

*Primary Examiner*—Eric W. Thomas
(74) *Attorney, Agent, or Firm*—Masuvalley & Partners (57) ABSTRACT

The present invention provides a solid electrolytic capacitor with low leakage current. In the solid electrolytic capacitor, an anode has an anode lead made of tantalum, a surface layer made of niobium formed on the anode lead, and a rectangular block shaped base body having a porous sintered body made from niobium particles, and the anode lead is partially embedded in the base body. Onto the anode, an oxide layer made of niobium oxide, an electrically conductive polymer layer, and a cathode laminated with a first electrically conductive layer and a second electrically conductive layer are sequentially laminated. Onto the top surface of an area surrounding the cathode, a cathode terminal is formed through an electrically conductive adhesive layer. Also, an anode terminal is connected onto an edge of the anode lead.

16 Claims, 7 Drawing Sheets

Prior Art

Fig.10

Prior Art

Fig. 11

Prior Art

Fig. 12

Prior Art

SOLID ELECTROLYTIC CAPACITOR ELEMENT, MANUFACTURING METHOD THEREFOR, AND SOLID ELECTROLYTIC CAPACITOR

TECHNICAL FIELD

The present invention relates to a solid electrolytic capacitor element, a manufacturing method therefor, and a solid electrolytic capacitor.

BACKGROUND OF INVENTION

In recent years, a solid electrolytic capacitor has been requiring the decrease in size and the increase in capacitance, and a solid electrolytic capacitor using niobium oxide having a large dielectric constant have been proposed, instead of using aluminum oxide or tantalum oxide as a dielectric material. An example of such proposal includes Japanese published unexamined patent application No. 2000-68157.

Figure 8:
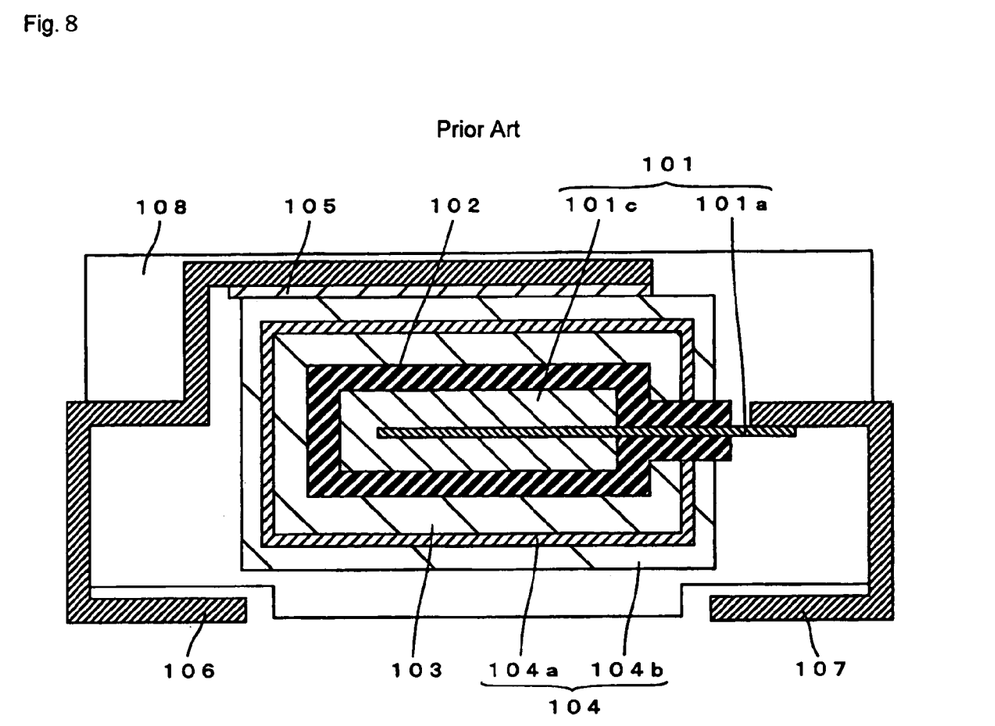
FIG. 8 is a cross-sectional view for illustrating a structure of a conventional solid electrolytic capacitor.

FIG. 8 is a cross-sectional view for illustrating a structure of a conventional solid electrolytic capacitor. The structure of the conventional solid electrolytic capacitor will be described in reference to FIG. 8.

As shown in FIG. 8, in the conventional solid electrolytic capacitor, an anode 101 comprises an anode lead 101a made of tantalum and a rectangular block shaped base body 101c comprised of a porous sintered body made from niobium particles, and the anode lead 101a is partially embedded in the base body 101c.

Onto the anode 101, an oxide layer 102 is formed so as to cover an area surrounding the base body 101c. The oxide layer 102 functions as a dielectric layer.

Onto the oxide layer 102, an electrically conductive polymer layer 103 made of polypyrrole or the like is formed so as to cover an area surrounding the oxide layer 102. The electrically conductive polymer layer 103 functions as an electrolyte layer. Onto the electrically conductive polymer layer 103, a cathode 104 is formed, which is laminated with a first electrically conductive layer 104a containing carbon particles formed so as to cover an area surrounding the electrically conductive polymer layer 103 and a second electrically conductive layer 104b containing silver particles formed so as to cover an area surrounding the first electrically conductive layer 104a.

Onto the top surface of an area surrounding the cathode 104, an electrically conductive adhesive layer 105 is formed, onto which a cathode terminal 106 is further formed. An anode terminal 107 is connected onto the anode lead 101a, which is exposed from the base body 101c and the oxide layer 102. Further, a mold-packaging resin 108 is formed around the cathode 104, the cathode terminal 106 and the anode terminal 107 such that respective edges of the cathode terminal 106 and the anode terminal 107 can be led outside. The conventional solid electrolytic capacitor is thus configured.

FIGS. 9 to 13 are cross-sectional views for illustrating a fabrication process of the conventional solid electrolytic capacitor. In reference to FIGS. 9 to 13, the fabrication process of the conventional solid electrolytic capacitor having the structure configured as above is now described.

Figure 9:
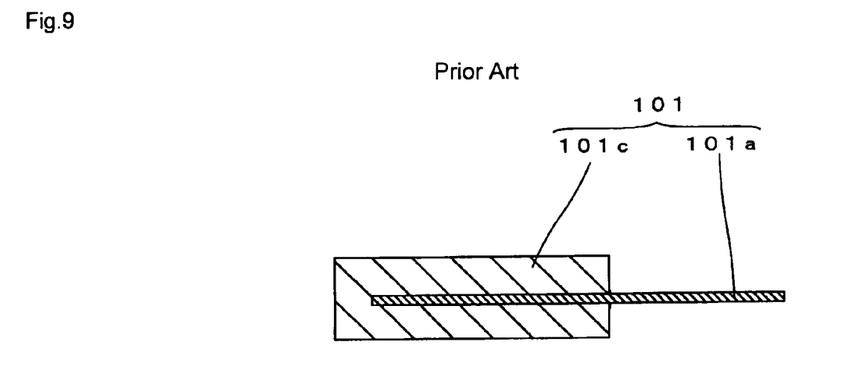
FIG. 9 is a cross-sectional view for illustrating a first step in a fabrication process of the conventional solid electrolytic capacitor.

First, as shown in FIG. 9, the anode 101 comprising the anode lead 101a made of tantalum and the rectangular block shaped base body 101c comprised of the porous sintered body made from niobium particles is formed. The base body 101c is formed by heat treatment process in vacuum a molding made from niobium particles, in which the anode lead 101a is partially embedded.

Figure 10:
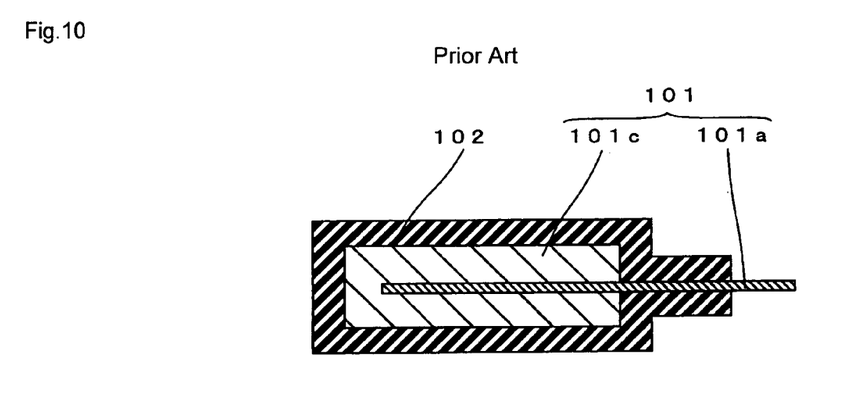
FIG. 10 is a cross-sectional view for illustrating a second step in the fabrication process of the conventional solid electrolytic capacitor.

Then, the anode 101 is anodized in an aqueous solution such as a phosphoric acid solution to thereby form the oxide layer 102 on the base body 101c so as to cover the area surrounding the base body 101c as shown in FIG. 10.

Figure 11:
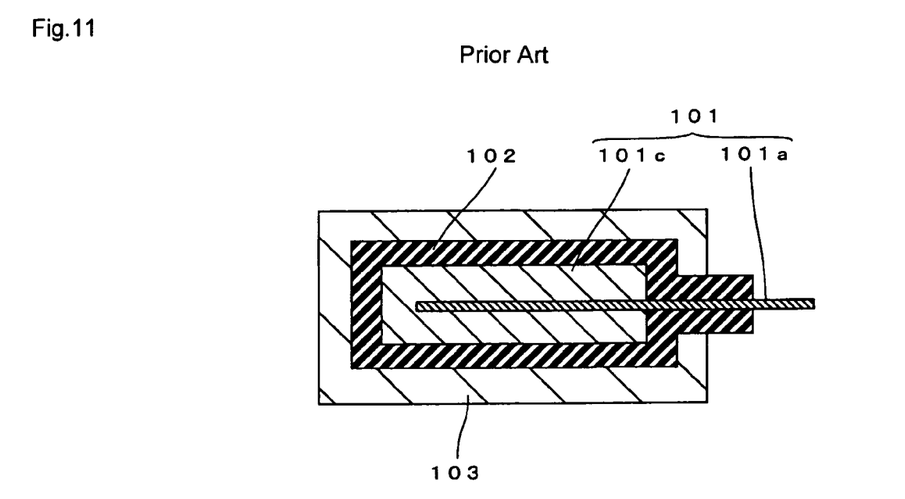
FIG. 11 is a cross-sectional view for illustrating a third step in the fabrication process of the conventional solid electrolytic capacitor.

Subsequently, as shown in FIG. 11, the electrically conductive polymer layer 103 made of polypyrrole or the like is formed onto the oxide layer 102 by polymerization or the like so as to cover the area surrounding the oxide layer 102.

Figure 12:
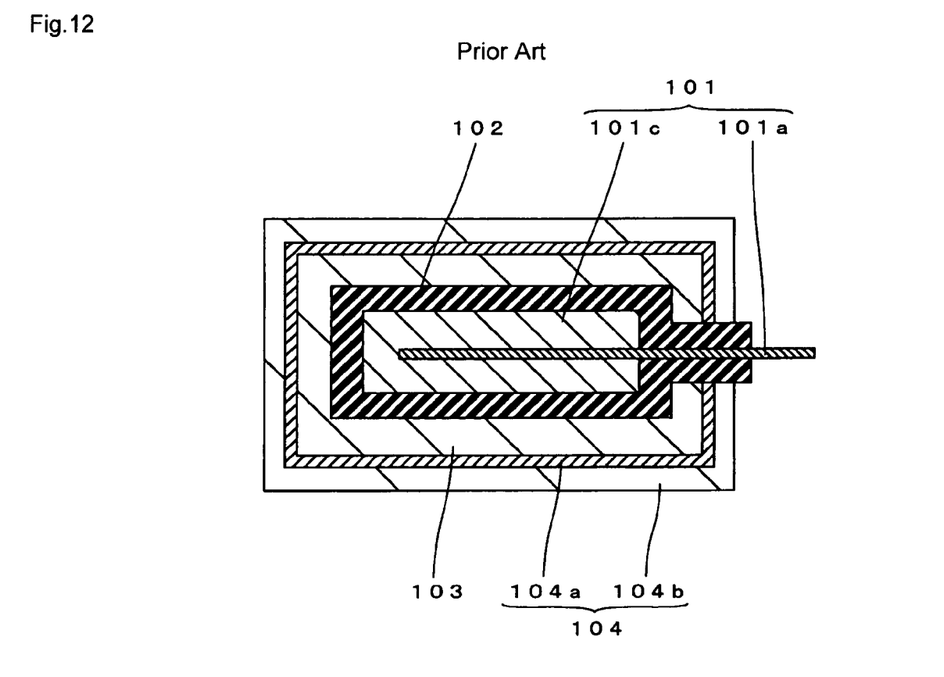
FIG. 12 is a cross-sectional view for illustrating a fourth step in the fabrication process of the conventional solid electrolytic capacitor.

Subsequently, as shown in FIG. 12, a carbon paste is coated onto the electrically conductive polymer layer 103 so as to cover the area surrounding the electrically conductive polymer layer 103, and then dried to thereby form the first electrically conductive layer 104a containing carbon particles. After that, a silver paste is coated on the first electrically conductive layer 104a so as to cover the area surrounding the first electrically conductive layer 104a, and then dried to thereby form the second electrically conductive layer 104b containing silver particles. This allows the cathode 104, which is laminated with the first electrically conductive layer 104a and the second electrically conductive layer 104b, to be formed so as to cover the area surrounding the electrically conductive polymer layer 103.

Figure 13:
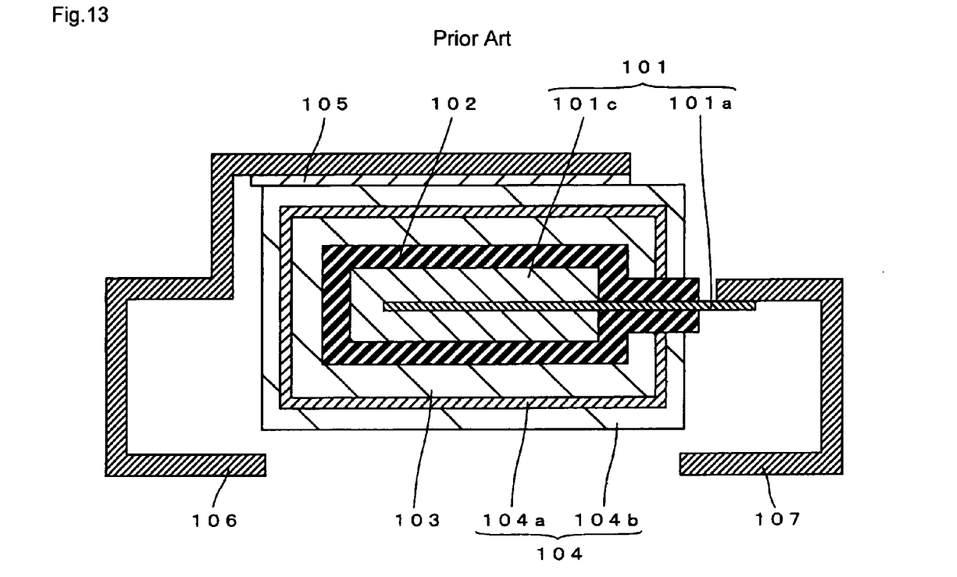
FIG. 13 is a cross-sectional view for illustrating a fifth step in the fabrication process of the conventional solid electrolytic capacitor.

Subsequently, as shown in FIG. 13, after an electrically conductive adhesive has been coated onto the cathode terminal 106, the cathode terminal 106 is bonded to the top surface of the area surrounding the cathode 104 through the electrically conductive adhesive. Further, drying the electrically conductive adhesive allows the electrically conductive adhesive layer 105 to be formed, through which the cathode 104 and the cathode terminal 106 are interconnected. Also, the anode terminal 107 is welded onto the anode lead 101a exposed from the base body 101c and the oxide layer 102.

Finally, as shown in FIG. 8, the mold-packaging resin 108 is formed around the cathode 104, the cathode terminal 106 and the anode terminal 107 such that the respective edges of the cathode terminal 106 and the anode terminal 107 can be led outside.

Figure 14:
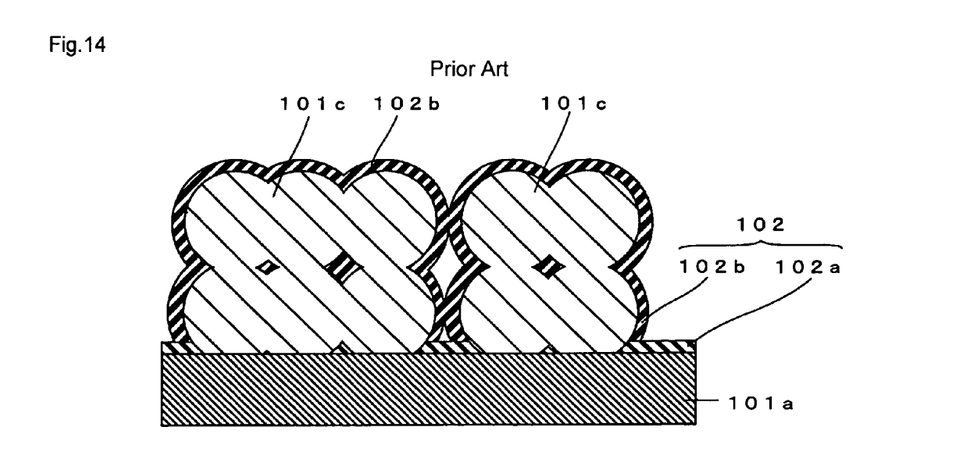
FIG. 14 is a schematic cross-sectional view for illustrating a condition of an oxide layer near an anode lead in the conventional solid electrolytic capacitor.

FIG. 14 is a schematic cross-sectional view for illustrating a condition of the oxide layer near the anode lead in the conventional solid electrolytic capacitor. Referring to FIG. 14, in the conventional solid electrolytic capacitor, the oxide layer 102 is formed on the surface of the anode lead 101a at positions of spaces that exist between the anode lead 101a and the base body 101c due to the base body 101c comprised of the porous sintered body, as well as on the surface of the base body 101c. Note that because the anode lead 101a is made of tantalum, an oxide layer 102a made of tantalum oxide is formed on the anode lead. On the other hand, because the base body 101c is made of niobium, an oxide layer 102b made of niobium oxide is formed on the base body 101c. For this reason, in the spaces existing between the anode lead 101a and the base body 101c, the oxide layer 102 is in a condition of a mixture of the oxide layer 102a made of tantalum oxide and the oxide layer 102b made of niobium oxide.

The above conventional solid electrolytic capacitor can achieve large electrostatic capacitance because the oxide layer 102 is comprised of niobium oxide except for an area in the vicinity of the interface between the anode lead 101a and the base body 101c as described.

However, in the above conventional solid electrolytic capacitor, the oxide layer 102 in the vicinity of the interface between the anode lead 101a and the base body 101c is in the condition of the mixture of the oxide layer 102a made of tantalum oxide and the oxide layer 102b made of niobium oxide, and therefore stress due to the difference in thermal expansion coefficient between the oxide layer 102a made of tantalum oxide and the oxide layer 102b made of niobium oxide arises during heat treatment process such as reflow soldering process. For this reason, there have arisen problems that the oxide layer 102 is likely to be peeled off from the anode lead 101a and the base body 101c and that cracks are likely to be generated inside of the oxide layer 102. As a result, there has arisen another problem that leakage current between the cathode 104 formed on the oxide layer 102 and the anode 101 is likely to be increased.

The present invention has been made in order to solve the problems described above, and it is therefore one object of the present invention to provide a solid electrolytic capacitor element or a solid electrolytic capacitor having low leakage current.

Another object of the present invention is to provide a method for manufacturing the solid electrolytic capacitor element having low leakage current.

BRIEF SUMMARY OF THE INVENTION

In order to accomplish the above objects, the solid electrolytic capacitor element comprises: an oxide layer that is formed on an anode and contains niobium oxide; and a cathode formed on the oxide layer, wherein the anode has: an anode lead; a surface layer that is formed on the anode lead and contains niobium; and a base body that is formed on the surface layer and comprised of a porous sintered body containing niobium.

In the solid electrolytic capacitor element according to the present invention, the anode has the anode lead and the base body containing niobium formed on the anode lead as described above, and therefore the oxide layer containing niobium oxide formed on the anode is also formed on a surface of the base body as well as on a surface of the anode lead at positions of spaces existing between the anode lead and the base body.

Note that because the anode lead is formed thereon with the surface layer containing niobium, the oxide layer is formed on the surface layer containing niobium. That is, at the positions of the spaces, the oxide layer containing niobium oxide is formed on the surface layer and the base body both containing niobium.

For this reason, the oxide layer containing niobium oxide is unlikely to be peeled off from the surface layer and the base body both containing niobium even during heat treatment process such as reflow soldering process, and cracks inside of the oxide layer are also unlikely to be generated. As a result, an increase in leakage current between the cathode formed on the oxide layer and the anode can be suppressed, so that a solid electrolytic capacitor element with low leakage current can easily be obtained.

Preferably, in the above-described solid electrolytic capacitor element, the anode lead contains tantalum and the anode lead around which the base body is not formed has thereon a region not formed with the surface layer. In other words, the anode lead contains tantalum, a first region formed with the surface layer is formed on the anode lead, and a terminal is formed outside of the first region.

Configuring as described allows a tantalum base material, which is more chemically stable than niobium and is unlikely to be oxidized, to be exposed in a region on the anode lead where the base body and the surface layer are not formed, and therefore an oxide coating is unlikely to be formed on the region during heat treatment process.

This enables a satisfactory electrical connection between the anode lead and the anode terminal to be made when the anode terminal is connected onto the region, so that a solid electrolytic capacitor element with low equivalent series resistance (ESR) can be obtained.

Preferably, in the solid electrolytic capacitor element, a film thickness of the surface layer falls within the range of 0.01 µm to 2 µm. A measurement of the film thickness of the surface layer is performed by an energy dispersive X-ray analysis (EDX) method.

Configuring as described enables a stress arising between the anode lead and the oxide layer to be sufficiently suppressed and adhesiveness of the surface layer on the anode lead to be improved, and therefore peeling off of the oxide layer and cracks in it are unlikely to be generated. This enables leakage current to be further reduced.

Also, the above-described surface layer suppresses a leakage current between the cathode and the anode to be less than 600 µA, and more preferably less than 300 µA.

Further, the method for manufacturing the solid electrolytic capacitor element according to the present invention comprises the steps of forming on an anode lead a surface layer containing niobium; forming on the surface layer an anode having a base body comprised of a porous sintered body containing niobium; forming on the anode by anodization an oxide layer containing niobium oxide; and forming a cathode on the oxide layer.

The step of forming the surface layer containing niobium may comprise cathodic reduction in molten lithium fluoride-sodium fluoride-potassium fluoride-potassium hexafluoroniobate (LiF—NaF—KF-K2NbF6) systems. Alternatively, the step of forming the surface layer containing niobium may comprise cathodic reduction in any of molten lithium fluoride-potassium fluoride-potassium hexafluoroniobate (LiF—KF-K2NbF6) systems or molten lithium fluoride-potassium hexafluoroniobate (LiF-K2NbF6) systems.

In the method for manufacturing the solid electrolytic capacitor element, as described above, surfaces of the anode lead having the surface layer containing niobium and the base body that is formed on the anode lead and comprised of a porous sintered body containing niobium are formed thereon with the oxide layer containing niobium oxide, so that the oxide layer containing niobium oxide can be readily formed also at positions of spaces existing between the anode lead and the base body.

For this reason, the oxide layer containing niobium oxide is unlikely to be peeled off from the surface layer and the base body both containing niobium even during heat treatment process such as reflow soldering process, and cracks inside of the oxide layer are also unlikely to be generated. As a result, an increase in leakage current between the cathode formed on the oxide layer and the anode can be suppressed, so that a solid electrolytic capacitor with low leakage current can easily be manufactured.

Also, the solid electrolytic capacitor according to the present invention comprises: an oxide layer that is formed on an anode and contains niobium oxide; and a cathode formed on the oxide layer, wherein the anode has: an anode lead; a surface layer that is formed on the anode lead and contains niobium; and a base body that is formed on the surface layer and comprised of a porous sintered body containing niobium, the base body being, an anode terminal is formed on the anode, a cathode terminal is formed on the cathode, and a mold-packaging resin is formed such that respective edges of the anode terminal and the cathode terminal are led outside.

For this reason, the oxide layer containing niobium oxide is unlikely to be peeled off from the surface layer and the base body both containing niobium even during heat treatment process such as reflow soldering process, and cracks inside of the oxide layer are also unlikely to be generated. As a result, an increase in leakage current between the cathode formed on the oxide layer and the anode can be suppressed, so that a solid electrolytic capacitor with low leakage current can easily be obtained.

DETAILED DESCRIPTION OF INVENTION

Examples of the present invention will hereinafter be described in reference to the drawings.

Example 1

Figure 1:
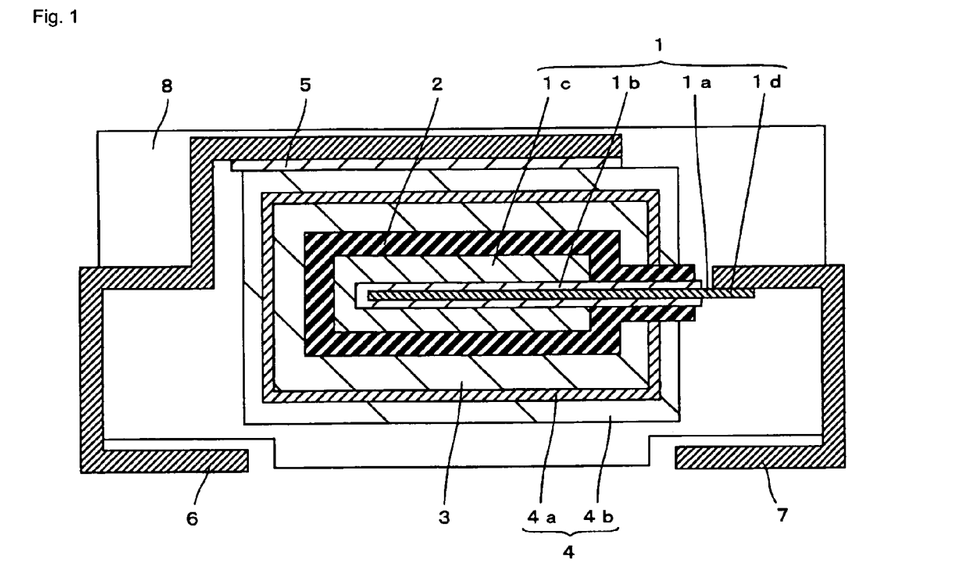
FIG. 1 is a cross-sectional view for illustrating a structure of a solid electrolytic capacitor according to Example 1 of the present invention.

FIG. 1 is a cross-sectional view for illustrating a structure of a solid electrolytic capacitor according to Example 1 of the present invention.

As shown in FIG. 1, in the rectangular block shaped solid electrolytic capacitor according to Example 1 of the present invention, an anode 1 comprises an anode lead 1a made of tantalum, a surface layer 1b made of niobium having a film thickness of approximately 0.1 μm formed on the anode lead 1a and a rectangular block shaped base body 1c with a size of approximately 3.3 mm×approx. 2.7 mm×approx. 1.7 mm comprised of a porous sintered body made from niobium particles having an average particle size of approximately 2 μm, and the anode lead 1a is partially embedded in the base body 1c. Also, the surface layer 1b is not formed on an edge 1d of the anode lead 1a where the anode lead 1a is not embedded in the base body 1c, and therefore a tantalum base material is exposed there. In addition, the edge 1d is one example of a "region where a surface layer is not formed" according to the present invention.

Onto the anode 1, an oxide layer 2 made of niobium oxide is formed so as to cover an area surrounding the anode 1. The oxide layer 2 functions as a so-called dielectric layer.

Onto the oxide layer 2, an electrically conductive polymer layer 3 made of polypyrrole is formed so as to cover an area surrounding the oxide layer 2. The electrically conductive polymer layer 3 functions as a so-called electrolyte layer. Onto the electrically conductive polymer layer 3, a cathode 4 is formed, which is laminated with a first electrically conductive layer 4a containing graphite particles formed so as to cover an area surrounding the electrically conductive polymer layer 3 and a second electrically conductive layer 4b containing silver particles formed so as to cover an area surrounding the first electrically conductive layer 4a.

Onto the top surface of an area surrounding the cathode 4, an electrically conductive adhesive layer 5 is formed, onto which a cathode terminal 6 is further formed. Also, the edge 1d of the anode lead 1a where the anode lead 1a is not embedded in the base body 1c is exposed from the surface layer 1b, the base body 1c and the oxide layer 2, and an anode terminal 7 is connected onto the edge 1d. Further, a mold-packaging resin 8 is formed around the cathode 4, the cathode terminal 6 and the anode terminal 7 such that respective edges of the cathode terminal 6 and the anode terminal 7 can be led outside. The solid electrolytic capacitor according to Example 1 of the present invention is thus configured.

FIGS. 2 to 6 are cross-sectional views for illustrating a fabrication process of the solid electrolytic capacitor according Example 1 of the present invention. In reference to FIGS. 2 to 6, the fabrication process of the solid electrolytic capacitor having the structure illustrated above according to Example 1 of the present invention is now described.

Figure 2:
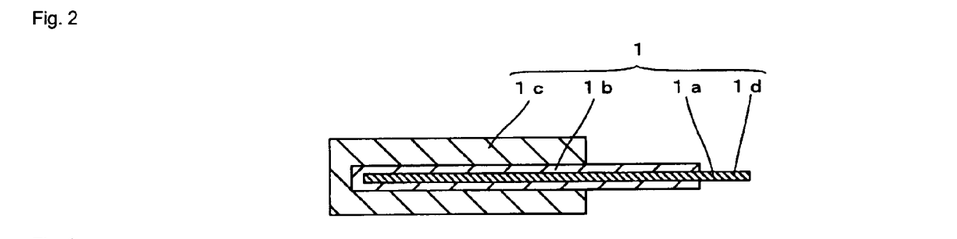
FIG. 2 is a cross-sectional view for illustrating a first step in a fabrication process of the solid electrolytic capacitor according to Example 1 of the present invention.

First, as shown in FIG. 2, the surface layer 1b made of niobium having a film thickness of approximately 0.1 μm was formed on the anode lead 1a by cathodically reducing the anode lead 1a for approximately 3 minutes in lithium fluoride-sodium fluoride-potassium fluoride-potassium hexafluoroniobate (LiF—NaF—KF—$K_2NbF_6$) systems that had been heated at approximately 550° C. to be thereby molten. The film thickness of the surface layer 1b may be identified by an energy dispersive X-ray analysis (EDX) method or the like. The cathodic reduction was performed without immersing one edge 1d of the anode lead 1a, whereby the tantalum base material was exposed at the edge 1d.

Then, the anode 1 comprising the anode lead 1a and the rectangular block shaped base body 1c with a size of approximately 3.3 mm×approx. 2.7 mm×approx. 1.7 mm comprised of a porous sintered body made from niobium particles having an average particle size of approximately 2 μm was formed. The base body 1c was formed by heat treatment process in vacuum a molding comprised of niobium particles in which the other edge of the anode lead 1a was embedded.

Figure 3:
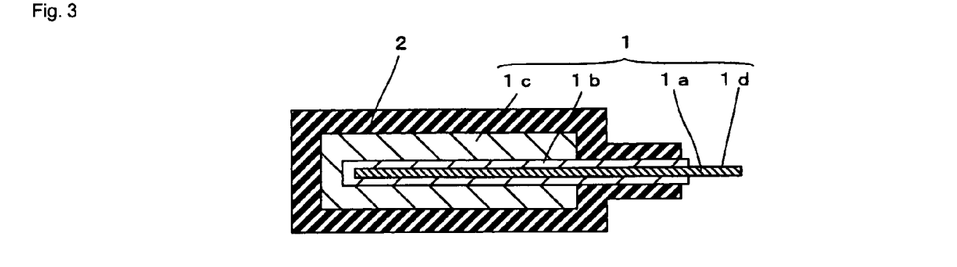
FIG. 3 is a cross-sectional view for illustrating a second step in the fabrication process of the solid electrolytic capacitor according to Example 1 of the present invention.

Subsequently, the anode 1 was anodized in an approximately 0.5 wt. % phosphoric acid solution, which was held at approximately 60° C., by applying a constant voltage of approximately 10 V for approximately 8 hours, whereby the oxide layer 2 made of niobium oxide was formed so as to cover the area surrounding the base body 1 as shown in FIG. 3.

Figure 4:
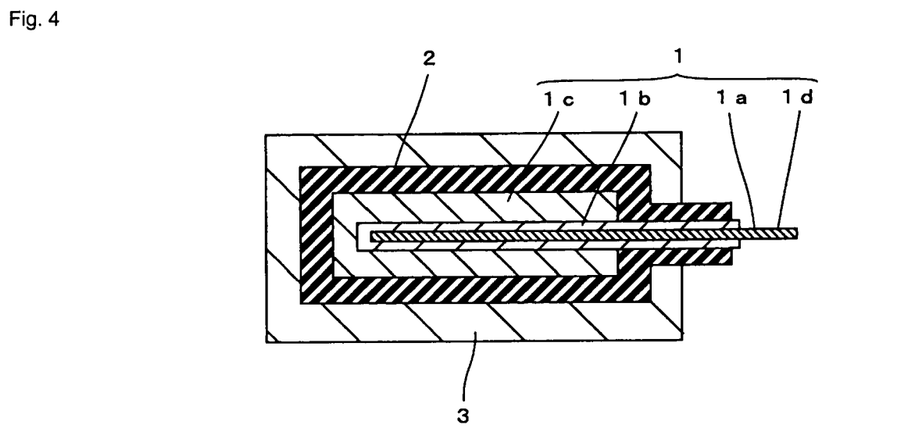
FIG. 4 is a cross-sectional view for illustrating a third step in the fabrication process of the solid electrolytic capacitor according to Example 1 of the present invention.

Subsequently, as shown in FIG. 4, the electrically conductive polymer layer 3 made of polypyrrole was formed on the oxide layer 2 by polymerization or the like so as to cover the area surrounding the oxide layer 2.

Figure 5:
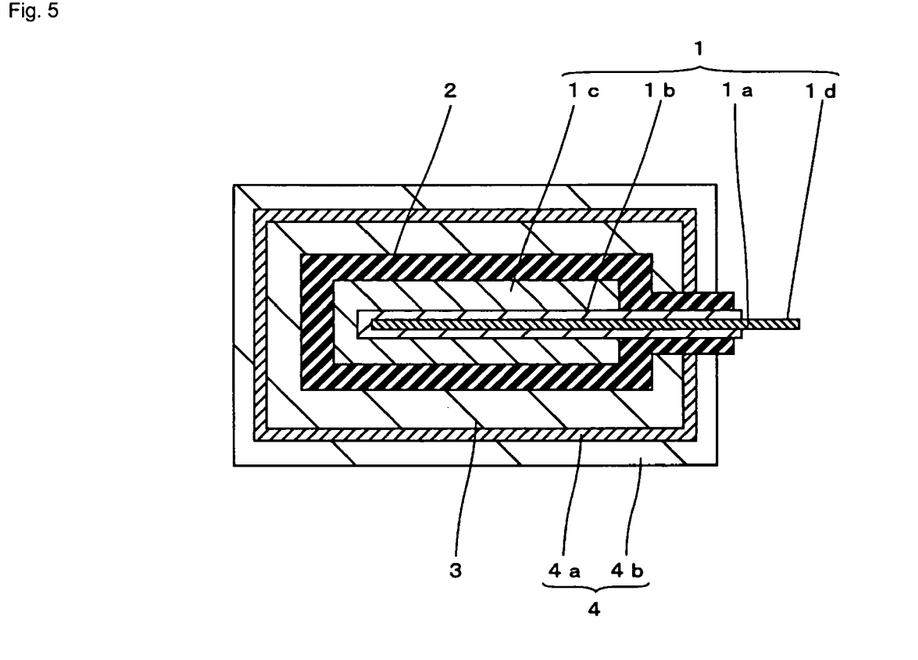
FIG. 5 is a cross-sectional view for illustrating a fourth step in the fabrication process of the solid electrolytic capacitor according to Example 1 of the present invention.

Subsequently, as shown in FIG. 5, a graphite paste was coated onto the electrically conductive polymer layer 3 so as to cover the area surrounding the electrically conductive polymer layer 3, and then dried at approximately 80° C. for approximately 30 minutes to thereby form the first electrically conductive layer 4a containing graphite particles. After that, a silver paste was coated on the first electrically conductive layer 4a so as to cover the area surrounding the first electrically conductive layer 4a, and then dried at approximately 170° C. for approximately 30 minutes to thereby form the second electrically conductive layer 4b containing silver particles. This allowed the cathode 4, which was laminated with the first electrically conductive layer 4a and the second electrically conductive layer 4b, to be formed so as to cover the area surrounding the electrically conductive polymer layer 3.

Figure 6:
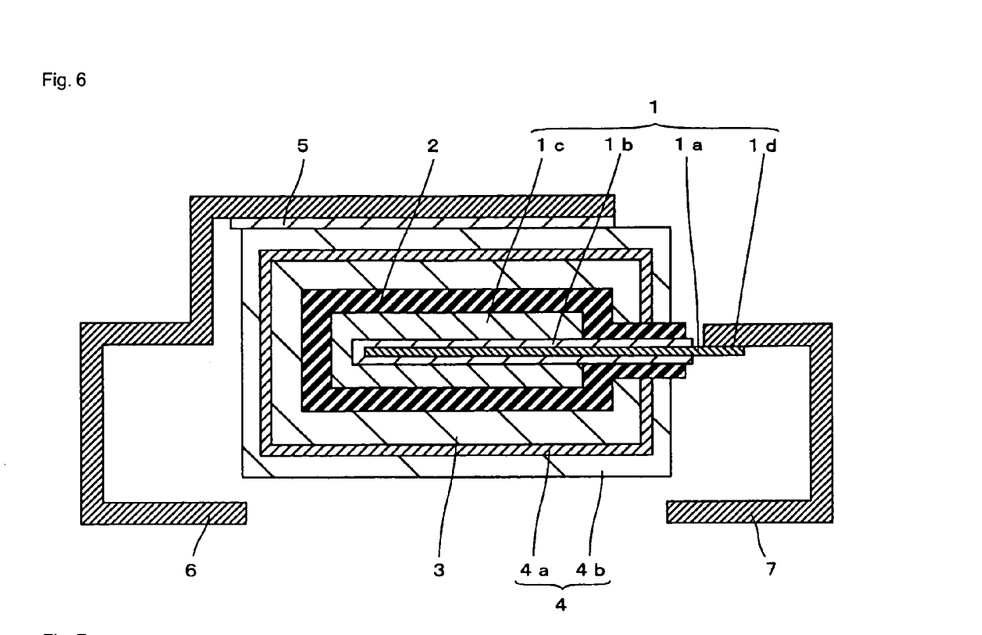
FIG. 6 is a cross-sectional view for illustrating a fifth step in the fabrication process of the solid electrolytic capacitor according to Example 1 of the present invention.

Subsequently, as shown in FIG. 6, after an electrically conductive adhesive had been coated in an amount of approximately 2 mg on the cathode terminal 6 made from iron foil of which a thickness was approximately 0.1 mm and a surface was nickel-plated, the cathode terminal 6 was bonded to the top surface of the area surrounding the cathode 4 through the electrically conductive adhesive. Further, drying the electrically conductive adhesive at approximately 60° C. for approximately 30 minutes allowed the electrically conductive adhesive layer 5 to be formed, through which the cathode 4 and the cathode terminal 6 were interconnected.

Also, the anode terminal 7 made from iron foil of which a thickness was approximately 0.1 mm and a surface was nickel-plated was welded onto the edge 1d of the anode lead 1a where the anode lead 1a was exposed from the surface layer 1b, the base body 1c, and the oxide layer 2.

Finally, as shown in FIG. 1, the mold-packaging resin 8 was formed around the cathode 4, the cathode terminal 6 and the anode terminal 7 such that the respective edges of the cathode terminal 6 and the anode terminal 7 were able to be led outside. The solid electrolytic capacitor according to Example 1 was thus fabricated as shown in FIG. 1.

In addition, in the present invention, a condition in which the cathode terminal 6 and the anode terminal 7 are formed and the mold-packaging resin 8 is formed around the cathode 4, the cathode terminal 6 and the anode terminal 7 is referred to as a solid electrolytic capacitor, and also, a prior condition as an element in which the terminals have not been connected is referred to as a solid electrolytic capacitor element.

Figure 7:
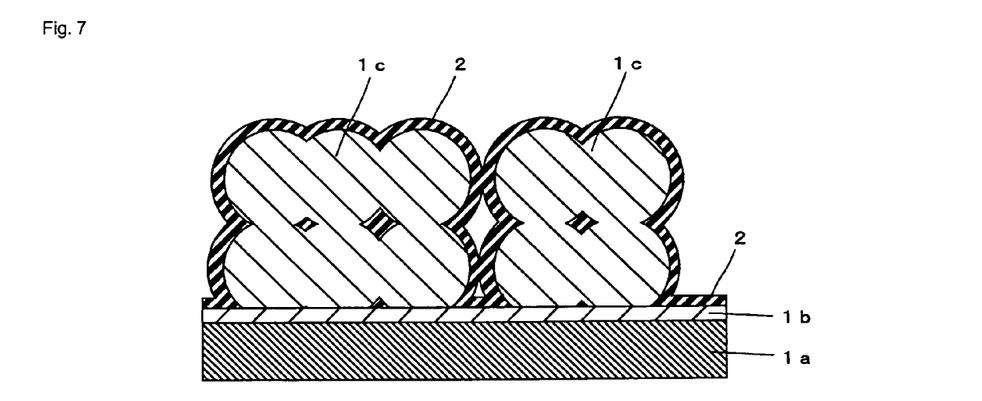
FIG. 7 is a schematic cross-sectional view for illustrating a condition of an oxide layer near an anode lead in the solid electrolytic capacitor according to Example 1 of the present invention.

FIG. 7 is a schematic cross-sectional view for illustrating a condition of the oxide layer near the anode lead in the solid electrolytic capacitor according to Example 1 of the present invention. Referring to FIG. 7, in the solid electrolytic capacitor according to Example 1 of the present invention, the oxide layer 2 formed on the anode 1 is also formed on the surfaces of the surface layer 1b and the base body 1c at positions of spaces that exist between the anode lead 1a and the base body 1c due to the base body 1c comprised of the porous sintered body. Because the surface layer 1b and the base body 1c contain niobium, the oxide layer 2 containing niobium oxide is unlikely to be peeled off from the surface layer 1b and the base body 1c even during heat treatment process such as reflow soldering process, and cracks inside of the oxide layer 2 are also unlikely to be generated. As a result, an increase in leakage current between the cathode 4 formed on the oxide layer 2 and the anode 1 can be suppressed, so that the leakage current can be decreased.

Also, in the above-described Example 1, the anode lead 1a is made of tantalum and a tantalum base material is exposed at the edge 1d of the anode lead 1a where the anode lead 1a is exposed from the base body 1c and the oxide layer 2, so that an oxide coating is unlikely to be formed on the edge 1d. This enables a satisfactory electrical connection between the anode lead 1a and the anode terminal 8 to be made when the anode terminal 8 is connected onto the edge 1d, so that ESR can be reduced.

Further, in the above-described Example 1, because the oxide layer 2 containing niobium oxide is formed by anodizing the anode 1 having the above configuration, the oxide layer 2 containing niobium oxide can readily be formed also on the surface layer 1b and the base body 1c both containing niobium at the positions of the spaces existing between the anode lead 1a and the base body 1c. For this reason, the oxide layer 2 containing niobium oxide is unlikely to be peeled off from the surface layer 1b and the base body 1c even during heat treatment process such as reflow soldering process, and cracks inside of the oxide layer 2 are also unlikely to be generated. As a result, an increase in leakage current between the cathode 4 formed on the oxide layer 2 and the anode 1 can be suppressed, so that a solid electrolytic capacitor with low leakage current can easily be manufactured.

As the next step, in order to examine an effect of Example 1 of the present invention, the following comparative experiments were performed.

Comparative Example 1

In Comparative Example 1, the conventional electrolytic capacitor shown in FIG. 8 was fabricated.

In other word, in Comparative Example 1, the solid electrolytic capacitor similar to that in Example 1 was fabricated, except that the capacitor in Comparative Example 1 employed the anode lead made of tantalum onto which the surface layer in Example 1 was not formed.

Comparative Example 2

In Comparative Example 2, a solid electrolytic capacitor similar to that in Comparative Example 1 was fabricated, except that the capacitor in Comparative Example 2 employed an anode lead made of niobium, instead of the anode lead made of tantalum in Comparative Example 1.

Also, leakage current measurements were performed on the solid electrolytic capacitors in the above Example 1, and Comparative Examples 1 and 2.

In the leakage current measurements, after heat treatment process of each of the fabricated solid electrolytic capacitors had been performed at approximately 240° C. for approximately 5 minutes, a constant voltage of approximately 5 V was applied between the cathode terminal and the anode terminal and a current value observed approximately 20 seconds after the application was measured on each capacitor. Measurement results are listed in Table 1.

TABLE 1

|  | Leakage current (μA) |
| --- | --- |
| Example 1 | 200 |
| Comparative Example 1 | 600 |
| Comparative Example 2 | 800 |

As listed in Table 1, it has turned out that the solid electrolytic capacitor in Example 1 exhibits a large reduction in leakage current in comparison with those in Comparative Examples 1 and 2.

Example 2

As the next step, an effect of a film thickness of the surface layer 1b in the solid electrolytic capacitor in Example 1 of the present invention was examined.

In other words, solid electrolytic capacitors similar to that in Example 1 were fabricated, except that a film thickness of the surface layer 1b was varied in Example 2 by varying a time period for cathodically reducing the anode lead 1a in molten LiF—NaF—KF-K2NbF6 systems in Example 1 in the range of approximately 10 seconds to approximately 2 hours 30 minutes as shown in Table 2.

Similarly to the case of Example 1, a film thickness of the surface layer 1b was measured by EDX and a leakage current was also measured. Measurement results are listed in Table 2.

TABLE 2

|  | Cathodic reduction time | Surface layer thickness (μm) | Leakage current (μA) |
| --- | --- | --- | --- |
| Example 2 | 10 seconds | 0.005 | 560 |
| Example 2 | 15 seconds | 0.0075 | 480 |
| Example 2 | 20 seconds | 0.01 | 270 |
| Example 2 | 2 minutes | 0.05 | 230 |
| Example 1 | 3 minutes | 0.1 | 200 |
| Example 2 | 15 minutes | 0.5 | 200 |
| Example 2 | 30 minutes | 1.0 | 210 |
| Example 2 | 1 hour | 2.0 | 210 |
| Example 2 | 1 hour 30 minutes | 3.0 | 460 |
| Example 2 | 2 hours 30 minutes | 5.0 | 540 |

As listed in Table 2, the film thickness of the surface layer 1b is varied in the range of approximately 0.005 μm to approximately 5.0 μm, depending on the variation in the time period for the cathodic reduction, and in this range, any of the capacitors exhibits a lower leakage current than those in Comparative Examples 1 and 2. Also, it has turned out that in the case where the film thickness of the surface layer 1b falls within the range of approximately 0.01 μm to approximately 2.0 μm, the leakage current is particularly low.

In addition, the examples disclosed herein should be considered exemplary in all aspects, and not as a limitation on the present invention. The scope of the present invention is defined not by the above description of the examples but by the appended claims, and further includes meanings equivalent to the claims and any modifications within the scope of the claims.

Also, in the above-described examples, the surface layer 1b made of niobium was employed; however, the present invention is not limited to this, but the surface layer 1b may contain another element such as tantalum, titanium, or nitrogen, besides niobium.

For example, in the examples, the surface layer 1b was formed by the cathodic reduction performed in molten LiF—NaF—KF-K2NbF6 systems; however, the present invention is not limited to this, but another molten salt containing niobium such as lithium fluoride-potassium fluoride-potassium hexafluoroniobate (LiF—KF—$K_2NbF_6$) systems or lithium fluoride-potassium hexafluoroniobate (LiF—$K_2NbF_6$) systems may be employed, or alternatively the layer may be formed by another thin film fabrication method. Also, after the fabrication of the surface layer 1b by the use of one of above methods, a heat treatment may be performed in a nitrogen atmosphere.

Further, in the above-described examples, the anode lead 1a made of tantalum was employed; however, the present invention is not limited to this, but the anode lead 1a may be comprised of, for example, a tantalum alloy containing another metal, such as niobium or titanium, or another element such as nitrogen, in addition to tantalum.

Still further, in the above-described examples, the porous sintered body made from niobium particles was employed as the base body 1c; however, the present invention is not limited to this, but the base body 1c may be comprised of a porous sintered body made from, for example, niobium alloy particles containing another metal such as tantalum or titanium, or another element such as nitrogen, in addition to niobium.

Still further, in the above-described examples, the oxide layer 2 was formed by anodizing the anode 1 in an aqueous solution; however, the present invention is not limited to this, but the oxide layer 2 may be formed by another method.

Still further, in the above-described examples, the electrically conductive polymer layer 3 made of polypyrrole was formed; however, the present invention is not limited to this, but another electrically conductive polymer such as polythiophene or polyaniline may be employed, or alternatively another electrically conductive material such as manganese oxide may be employed.

What is claimed is:

1. A solid electrolytic capacitor element comprising:
   an oxide layer containing niobium oxide, the oxide layer being formed on an anode;
   a cathode formed on the oxide layer,
   wherein the anode has:
   an anode lead;
   a surface layer containing niobium, the surface layer being formed on the anode lead; and
   a base body comprised of a porous sintered body containing niobium, the base body being formed on the surface layer.

2. The solid electrolytic capacitor element according to claim 1, wherein the anode lead contains tantalum and the anode lead not formed there around with the base body has thereon a region not formed with the surface layer.

3. The solid electrolytic capacitor element according to claim 1, wherein the anode lead contains tantalum, and a first region formed with the surface layer is formed on the anode lead, and a terminal is formed outside of the first region.

4. The solid electrolytic capacitor element according to claim 1, wherein a film thickness of the surface layer falls within a range of 0.01 μm to 2 μm.

5. The solid electrolytic capacitor element according to claim 4, wherein a measurement of the film thickness of the surface layer is performed by an energy dispersive X-ray analysis (EDX) method.

6. The solid electrolytic capacitor element according to claim 4, wherein the anode lead contains tantalum and the anode lead not formed there around with the base body has thereon a region not formed with the surface layer.

7. The solid electrolytic capacitor element according to claim 4, wherein the anode lead contains tantalum, a first region formed with the surface layer is formed on the anode lead, and a terminal is formed outside of the first region.

8. The solid electrolytic capacitor element according to claim 4, wherein the film thickness of the surface layer preferably falls within a range of 0.1 μm to 0.5 μm.

9. The solid electrolytic capacitor element according to claim 8, wherein a measurement of the film thickness of the surface layer is performed by an energy dispersive X-ray analysis (EDX) method.

10. The solid electrolytic capacitor element according to claim 1, wherein the surface layer suppresses a leakage current between the cathode and the anode to be less than 600 μA.

11. The solid electrolytic capacitor element according to claim 1, wherein the surface layer suppresses a leakage current between the cathode and the anode to be less than 300 μA.

12. A method for manufacturing a solid electrolytic capacitor element, the method comprising the steps of:
    forming on an anode lead a surface layer containing niobium;
    forming on the surface layer an anode having a base body comprised of a porous sintered body containing niobium;
    forming on the anode by anodization an oxide layer containing niobium oxide; and
    forming a cathode on the oxide layer.

13. The method for manufacturing a solid electrolytic capacitor element according to claim 12, wherein the step of forming the surface layer containing niobium comprises a cathodic reduction in an element selected from a group consisting of: molten lithium fluoride; sodium fluoride; potassium fluoride; and potassium hexafluoroniobate (LiF—NaF—KF—$K_2NbF_6$).

14. The method for manufacturing a solid electrolytic capacitor element according to claim 12, wherein the step of forming the surface layer containing niobium comprises a cathodic reduction in an element selected from a group consisting of: molten lithium fluoride; potassium fluoride; and potassium hexafluoroniobate (LiF—KF—$K_2NbF_6$).

15. The method for manufacturing a solid electrolytic capacitor element according to claim 12, wherein the step of forming the surface layer containing niobium comprises a cathodic reduction in an element selected from a group consisting of: molten lithium fluoride and potassium hexafluoroniobate (LiF—$K_2NbF_6$).

16. A solid electrolytic capacitor comprising:
    an oxide layer containing niobium oxide, the oxide layer being formed on an anode;
    a cathode formed on the oxide layer, wherein
    the anode has: an anode lead; a surface layer containing niobium, the surface layer being formed on the anode lead; and a base body comprised of a porous sintered body containing niobium, the base body being formed on the surface layer, and
    an anode terminal is formed on the anode, a cathode terminal is formed on the cathode, and a mold-packaging resin is formed such that respective edges of the anode terminal and the cathode terminal are led outside.

* * * * *